US012728902B2

(12) United States Patent
Wu

(10) Patent No.: US 12,728,902 B2
(45) Date of Patent: Sep. 8, 2026

(54) MORE STABLE GATHERING TRAILER

(71) Applicant: Qingyuan Wu, Jinhua (CN)

(72) Inventor: Qingyuan Wu, Jinhua (CN)

(*) Notice: Subject to any disclaimer, the term of this patent is extended or adjusted under 35 U.S.C. 154(b) by 213 days.

(21) Appl. No.: 18/469,471

(22) Filed: Sep. 18, 2023

(65) Prior Publication Data

US 2025/0042458 A1 Feb. 6, 2025

(30) Foreign Application Priority Data

Aug. 1, 2023 (CN) ......................... 202322049612.7

(51) Int. Cl.
*B62B 3/02* (2006.01)
*B62B 3/00* (2006.01)
*B62B 5/06* (2006.01)

(52) U.S. Cl.
CPC ................ *B62B 3/02* (2013.01); *B62B 3/002* (2013.01); *B62B 5/067* (2013.01); *B62B 2205/06* (2013.01)

(58) Field of Classification Search
CPC ................................ B62B 3/025; B62B 5/067
See application file for complete search history.

(56) References Cited

U.S. PATENT DOCUMENTS 8,002,363 B2 * 8/2011 Cheng ................. B60B 33/0068 301/121
9,056,621 B1 * 6/2015 Jin .......................... B62B 3/027
9,073,564 B2 * 7/2015 Yang ....................... B62B 3/002
9,101,206 B1 * 8/2015 Chen ..................... B62B 5/0013
9,580,095 B2 * 2/2017 Vargas, II ................. B62B 3/02
9,738,298 B1 * 8/2017 Yang ....................... B62B 3/025
10,040,470 B1 * 8/2018 Horowitz ................ B62B 3/102
10,099,711 B1 * 10/2018 Sun ......................... B62B 3/007
10,099,712 B1 * 10/2018 Sun ......................... B62B 5/067
10,399,586 B1 * 9/2019 Huang ...................... B62B 5/06
10,633,010 B1 * 4/2020 Zhang ..................... B62B 3/025
10,836,418 B2 * 11/2020 Zhu ......................... B62B 3/025
10,953,903 B1 * 3/2021 Park ........................ B62B 3/007
10,953,904 B1 * 3/2021 Sun ......................... B62B 3/002
10,988,153 B1 * 4/2021 Horowitz ................ B62B 7/008
11,370,467 B1 * 6/2022 Horowitz ................ B62B 3/007
11,572,091 B1 * 2/2023 Wang ........................ B62B 5/00
D1,000,537 S * 10/2023 Wu ............................... D34/12
11,851,097 B2 * 12/2023 Chu ........................ B62B 5/067

(Continued)

*Primary Examiner* — Erez Gurari
(74) *Attorney, Agent, or Firm* — Birchwood IP

(57) ABSTRACT

The application is for trailers, and specifically is a more stable gathering trailer, comprising a rod assembly, which includes four rods, an upper fixing part, a lower fixing part, and a middle movable part, and also includes a left-right contraction control assembly, a left-right contraction control assembly comprising a first right-left adjusting lever, second right-left adjusting lever, third right-left adjusting lever, fourth left-right adjusting lever, fifth right-left adjusting lever, sixth right-left adjusting lever, seventh right-left adjusting lever, and an eighth right-left adjusting lever; when the gathering trailer loaded with cargo, the first left-right adjusting lever, fifth left-right adjusting lever, fourth right-left adjusting lever and the eighth left-left adjusting lever are used. It is difficult to deform when loaded with goods because the sixth left-right adjusting lever and the seventh left-right adjusting lever can support the fifth left-right adjusting lever and the eighth left-right adjusting lever, respectively.

10 Claims, 8 Drawing Sheets

(56) References Cited

U.S. PATENT DOCUMENTS

| | | | | |
|---|---|---|---|---|
| 11,932,298 | B2 * | 3/2024 | Sun | B62B 3/007 |
| 11,958,520 | B1 * | 4/2024 | Sun | B62B 3/007 |
| 12,012,139 | B2 * | 6/2024 | Sun | B62B 3/007 |
| D1,041,115 | S * | 9/2024 | Zhou | D34/12 |
| D1,069,308 | S * | 4/2025 | Wu | D34/12 |
| D1,083,274 | S * | 7/2025 | Wu | D34/12 |
| D1,086,629 | S * | 7/2025 | Wu | D34/12 |
| 12,365,376 | B1 * | 7/2025 | Wang | B62B 3/007 |
| 12,371,084 | B2 * | 7/2025 | Qiao | B62B 5/067 |
| 2018/0057035 | A1 * | 3/2018 | Choi | B62B 9/26 |
| 2021/0107548 | A1 * | 4/2021 | Wang | B62B 3/007 |
| 2021/0300449 | A1 * | 9/2021 | Yang | B62B 3/025 |
| 2021/0300450 | A1 * | 9/2021 | Yang | B62B 3/002 |
| 2024/0300560 | A1 * | 9/2024 | Zhang | B62B 3/007 |
| 2024/0400120 | A1 * | 12/2024 | Sun | B62B 3/025 |
| 2024/0425111 | A1 * | 12/2024 | Luo | B62D 13/04 |
| 2025/0018989 | A1 * | 1/2025 | Zhang | B62B 3/002 |
| 2025/0074489 | A1 * | 3/2025 | Yang | B62B 3/007 |
| 2025/0162639 | A1 * | 5/2025 | Zehfuss | B62B 3/007 |
| 2025/0242848 | A1 * | 7/2025 | Cheng | B62B 5/067 |
| 2025/0249943 | A1 * | 8/2025 | Gao | B62B 3/025 |
| 2025/0289489 | A1 * | 9/2025 | Xu | B62B 5/067 |

* cited by examiner

MORE STABLE GATHERING TRAILER

CROSS-REFERENCE TO RELATED APPLICATIONS

This application claims priority of Chinese Patent Application No. 202322049612.7, filed on Aug. 1, 2023, the entire contents of which are incorporated herein by reference.

TECHNICAL FIELD

The application involves the field of trailers, and particularly relates to more stable polytrailers.

BACKGROUND TECHNOLOGY

In daily life and production, it is often necessary to carry luggage or goods, etc., and trailer tools are often used in the process of carrying. Trailers are widely used in moving things because of their convenient and time-saving features.

For saving occupied space, the trailer in the non-use state of the storage is currently a major hot spot in the industry, the storage is mainly used to a number of cross-rotating side support bars folded into each other, the formation of a rhombic angle between a number of side support bars, but the trailer is placed inside the items, the rhombic structure is not stable enough, the items are easy to push the two sides of the support bars to deform when the trailer shakes.

The technical problem to be solved in the present application is: how to provide a folding gathering trailer with a more stable structure.

CONTENTS OF APPLICATION

For the purpose of overcoming the deficiencies of the prior art, it is an object of the present application to provide a gathering trailer that is structurally stable and easy to fold and store.

The technical solution adopted in the present application is as follows: a more stable gathering trailer comprising a rod assembly, said rod assembly comprising a first riser, a second rod, a third rod and a fourth rod, the top and the bottom of the four said rods are fixed with upper fixing members and lower fixing members, respectively, and the outer part of the four said rods is also provided with a central movable member which is slidingly cooperated with it;

A left-right contraction adjustment assembly is provided between said first and third rods and between said second and fourth rods respectively, said left-right contraction adjustment assembly comprising a first left-right adjustment lever and a fourth left-right adjustment lever rotationally coordinated with the upper fixing part, as well as a fifth left-right adjustment lever and an eighth left-right adjustment lever rotationally coordinated with the central movable parts, and said fifth left-right adjustment lever is equipped with a sixth left-right adjustment lever and a second left-right adjustment lever in turn, said eighth left-right adjustment lever is equipped with a sixth left-right adjustment lever and a second right-right adjustment lever, and said eighth left-right adjustment lever is equipped with a second left-right adjustment lever and a second right-right adjustment lever. The fifth left-right adjusting lever is provided with a sixth left-right adjusting lever and a second left-right adjusting lever, and the eighth left-right adjusting lever is provided with a seventh left-right adjusting lever and a third left-right adjusting lever.

In some implementations, the said first right/left adjusting rod and the fourth right/left adjusting rod are connected by a rotary axis, the said fifth right/left adjusting rod and the first right/left adjusting rod are connected by a rotary axis, the said fifth right/left adjusting rod and the sixth right/left adjusting rod are connected by a rotary axis, the said sixth right/left adjusting rod is connected by a rotary axis to a second right/left adjusting rod, and the said second right/left adjusting rod is also connected by a third right/left adjusting rod by a rotary axis. spindle, said first left-right adjusting lever, second left-right adjusting lever, fifth left-right adjusting lever, and sixth left-right adjusting lever being symmetrically disposed with the fourth left-right adjusting lever, the third left-right adjusting lever, the eighth left-right adjusting lever, and the seventh left-right adjusting lever.

In some implementations, a front-back contraction adjustment assembly is provided between said first and second upright rods and said third and fourth upright rods, respectively, said front-back contraction adjustment assembly comprising a first front-back adjustment rod and a second front-back adjustment rod rotationally cooperating with the upper fixing member, and said front-back contraction adjustment assembly further comprising a third front-back adjustment rod and a fourth front-back adjustment rod rotationally cooperating with the middle movable member.

In some implementations, said first fore-and-aft adjusting lever and said second front-and-back adjusting lever are connected by a pivot shaft, said third fore-and-aft adjusting lever and said fourth fore-and-aft adjusting lever are connected by a pivot shaft, said first fore-and-aft adjusting lever and third fore-and-aft adjusting lever are connected by a pivot shaft, said second fore-and-aft adjusting lever and fourth fore-and-aft adjusting lever are connected by a pivot shaft, said first fore-and-aft adjusting lever and third fore-and-aft adjusting lever are connected to the second said first fore-and-aft adjusting lever and third fore-and-aft adjusting lever symmetrically with the second fore-and-aft adjusting lever and the fourth fore-and-aft adjusting lever.

In some embodiments, said rod assembly is provided with a lifting assembly at the bottom of said rod assembly, said lifting assembly comprising a first lifting rod, a second lifting rod, a third lifting rod and a fourth lifting rod rotationally cooperating with four lower fixing members respectively, said first lifting rod, said second lifting rod, said third lifting rod and said fourth lifting rod being in an X-shape, and a lifting member rotationally cooperating with said lifting member being provided at the cross center of the four said lifting rods.

In some embodiments, a tie rod assembly is provided between said first rod and said second rod, said tie rod assembly comprising a tie rod joint member fixed to the bottom of the first rod and the second rod, both said tie rod joint members are provided with a contraction rod rotationally cooperating therewith, both said contraction rods are provided with tie rod fixings rotationally cooperating therewith at the same time, said tie rod fixings are fixed with a third tie rod within said third tie rod, said third tie rod is provided with a sliding and lifting tie rod rotationally cooperating therewith. said third tie rod is fixed in said tie rod fixing member, said third tie rod is provided with a second tie rod sliding up and down therewith, said second tie rod is provided with a first tie rod sliding up and down therewith, and said first tie rod is fixed with a puller at the top of said first tie rod.

In some implementations, a movable assembly is also provided at the bottom of said rod assembly, said movable assembly comprising wheel carriers mounted at the bottom of each of the four risers, with wheels provided within each of said wheel carriers.

In some implementations, when the said gathering trailer is folded, the side angle between said first right/left adjusting lever and fifth right/left adjusting lever, said fifth right/left adjusting lever and sixth right/left adjusting lever, said first right/left adjusting lever and second right/left adjusting lever, said fourth right/left adjusting lever and eighth right/left adjusting lever, said eighth right/left adjusting lever and seventh right/left adjusting lever, said fourth right/left adjusting lever and third right/left adjusting lever is progressively increased, and said end angle between the fifth left-right adjusting lever and the sixth left-right adjusting lever, the sixth left-right adjusting lever and the second left-right adjusting lever, the fifth left-right adjusting lever and the second left-right adjusting lever, the second left-right adjusting lever and the third left-right adjusting lever, the eighth left-right adjusting lever and the seventh left-right adjusting lever, the seventh left-right adjusting lever and the third left-right adjusting lever, the eighth left-right adjusting lever and the fourth left-right adjusting lever is progressively decreasing.

In some implementations, said end pinch angle between said first front-to-back adjusting lever and second front-to-back adjusting lever, third front-to-back adjusting lever and fourth front-to-back adjusting lever gradually decreases, and said side pinch angle between said first front-to-back adjusting lever and third front-to-back adjusting lever, second front-to-back adjusting lever and fourth front-to-back adjusting lever gradually increases, when said poly trailer is folded.

In some implementations, when said gathering trailer is folded, said lifting member gradually rises, and said first lifting bar, second lifting bar, third lifting bar and fourth lifting bar gradually rise near one end of the lifting member.

The beneficial effect of the present application is that when the gathering trailer is folded, the central movable member descends at the same time to ensure that the intersection of the second left-right adjusting lever and the third left-right adjusting lever is moved downwardly, and similarly, the intersection of the second front-back adjusting lever and the third front-back adjusting lever is moved downwardly as well, ensuring that the highest point of the second left-right adjusting lever, the third left-right adjusting lever, the second front-back adjusting lever, and the third front-back adjusting lever after being contracted will not be above the horizontal line where the upper fixing member is located, so as to ensure that the highest point of the aggregated trailer after contraction is flush with the highest point of the upper fixing member, so as to achieve the effect that the height does not rise after contraction; when the aggregated trailer is loaded with cargoes, the cargoes may push the plane between the first vertical rod and the second vertical rod, or between the third vertical rod and the fourth vertical rod when they are shaken from side to side, at this time, the first left-right adjusting rod and the fifth left-right adjusting rod and the triangle structure formed in the middle of the fourth left-right adjusting rod and the eighth left-right adjusting rod can obtain a larger support force to prevent it from deformation, and the sixth left-right adjusting rod and the seventh left-right adjusting rod can also play a downward and upward support force to the fifth left-right adjusting rod and the eighth left-right adjusting rod respectively to further strengthen its triangular stabilizing structure, so that deformation will not easily occur when the cargo is loaded, and the pulling of the Higher stability when pulling the aggregated trailer.

NOTE WITH DRAWINGS AND FIGURES

In the figure: 1, a tie rod assembly; 11, a puller; 12, a first tie rod; 13, a second tie rod; 14, a third tie rod; 15, a tie rod joint member; 16, a contraction rod; 17, a tie rod fixing member;

2, a rod assembly; 21, a first rod; 22, a second rod; 23, a third rod; 24, a fourth rod; 25, an upper fixing member; 26, a central movable member; 27, a lower fixing member;

3, a front-back contraction adjustment assembly; 31, a first front-back adjustment rod; 32, a second front-back adjustment rod; 33, a third front-back adjustment rod; 34, a fourth front-back adjustment rod;

4, a left-right contraction adjustment assembly; 41, a first left-right adjustment rod; 42, a second left-right adjustment rod; 43, a third left-right adjustment rod; 44, a fourth left-right adjustment rod; 45, a fifth left-right adjustment rod; 46, a sixth left-right adjustment rod; 47, a seventh left-right adjustment rod; 48, an eighth left-right adjustment rod;

5, a lifting assembly; 51, a first lifting rod; 52, a second lifting rod; 53, a third lifting rod; 54, a fourth lifting rod; 55, a lifting member; 6, a movable assembly; 61, a wheel frame; 62, a wheel.

PRACTICAL IMPLEMENTATION

The technical solutions in the implementations of the present application will be described clearly and completely in the following in conjunction with the accompanying drawings in the implementations of the present application, and it is obvious that the described implementations are only a part of the implementations of the present application and not all of the implementations.

Figure 1:
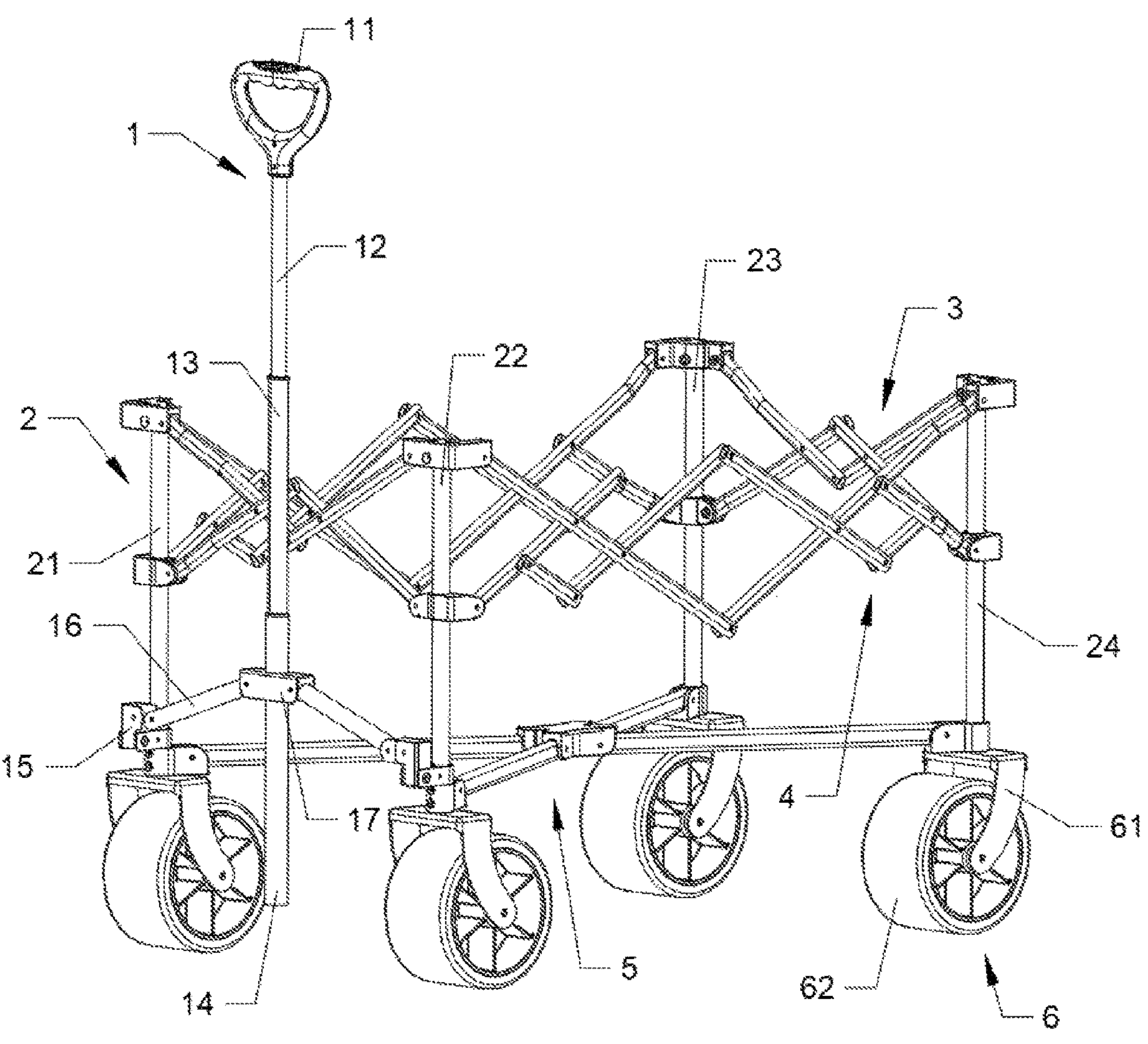
FIG. 1 shows a three-dimensional structural schematic diagram of the unfolded state of the present application.
Figure 2:
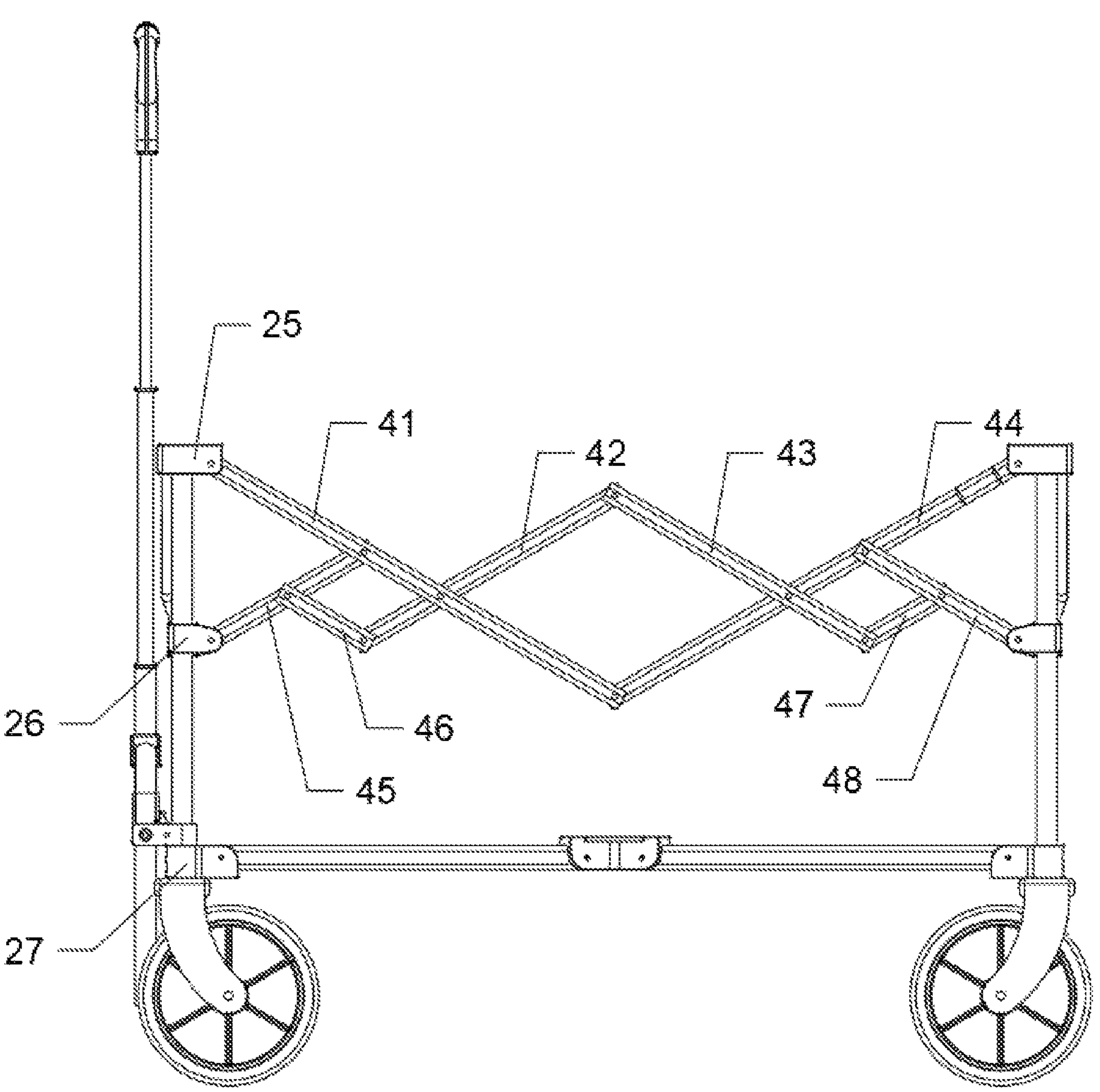
FIG. 2 is a schematic diagram of the main view structure of the unfolded state of the present application.
Figure 3:
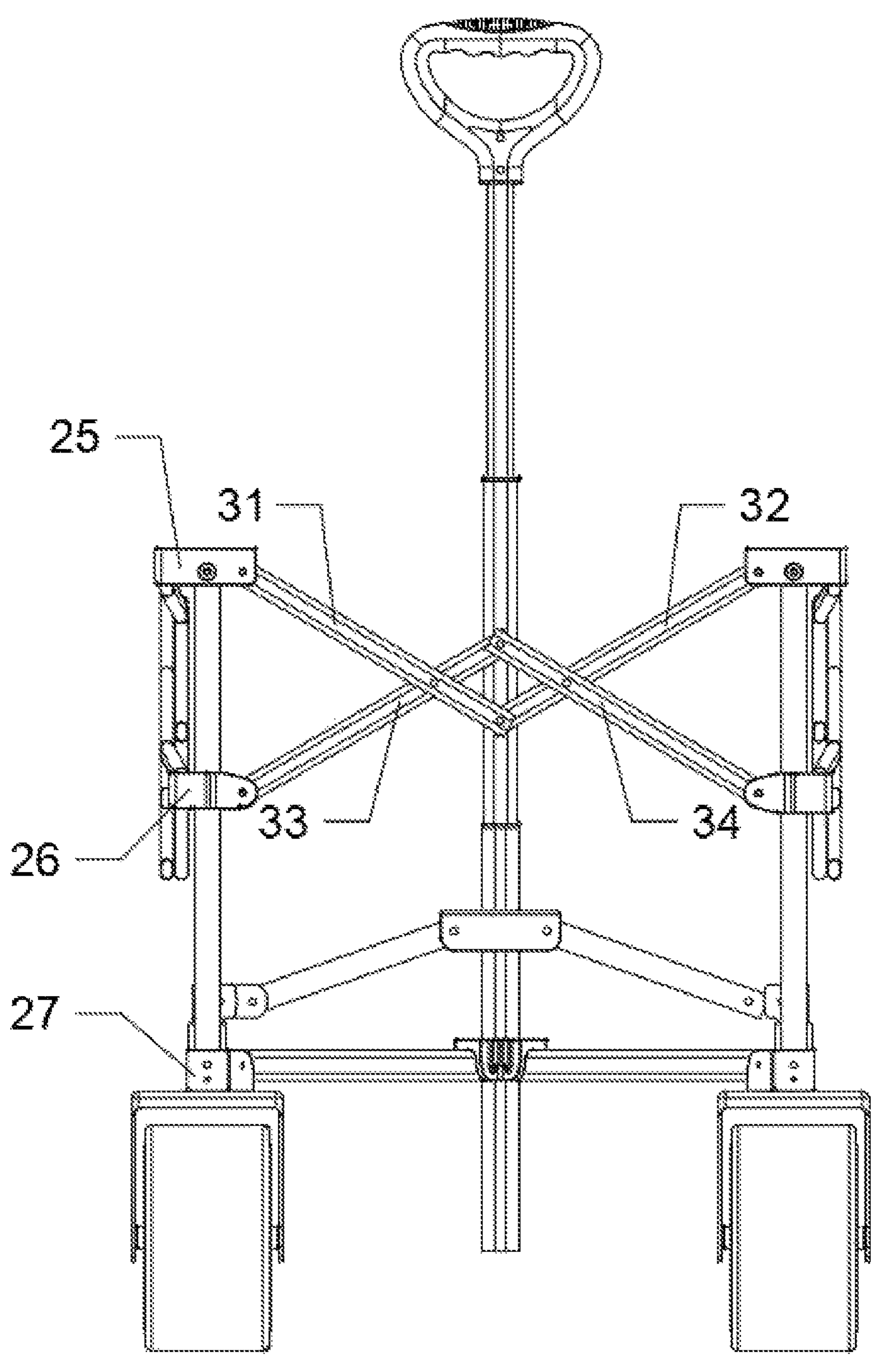
FIG. 3 is a schematic diagram of the right-view structure of the unfolded state of the present application.
Figure 4:
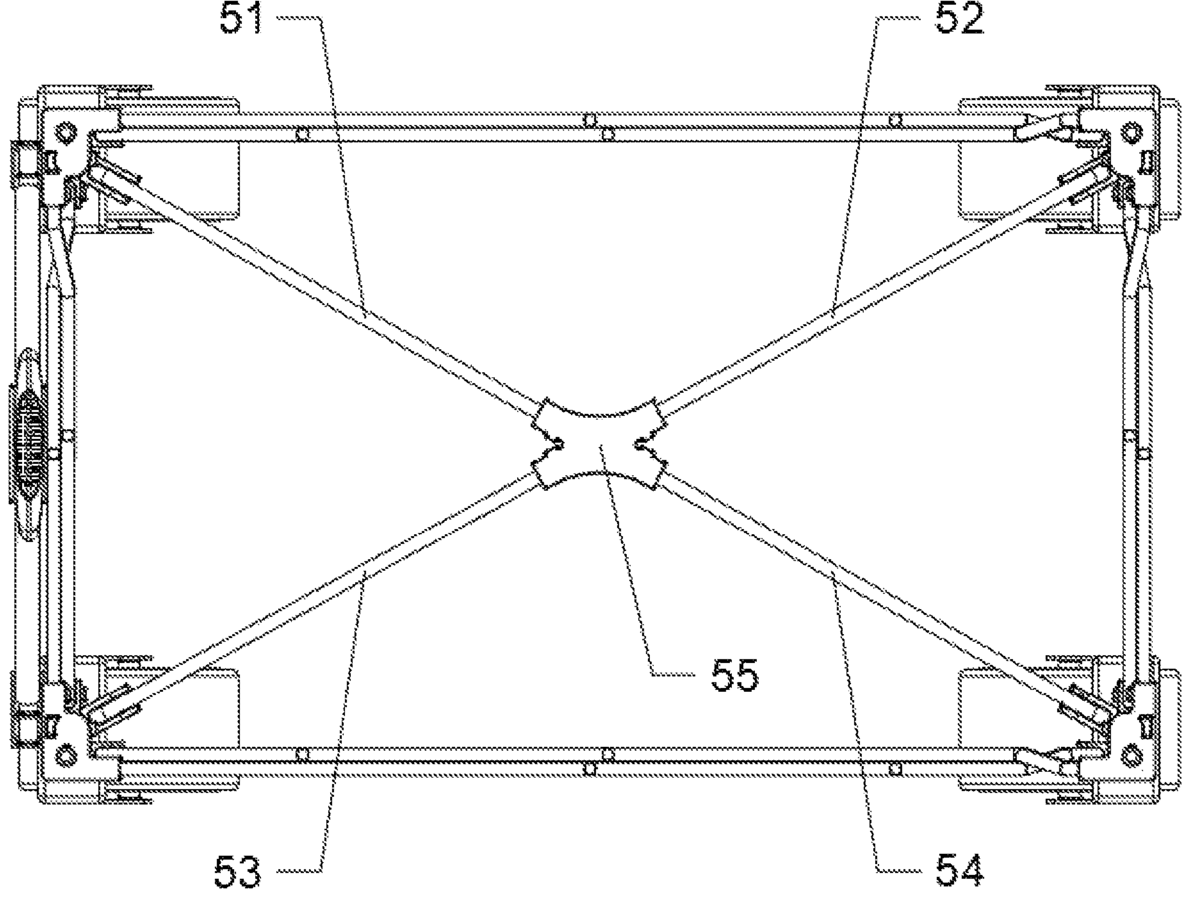
FIG. 4 is a schematic diagram of the top view structure of the unfolded state of the present application.

Please refer to FIGS. 1 to 4, the application provides a technical solution: a more stable gathering trailer comprising a rod assembly 2, the rod assembly 2 comprising a first riser 21, a second riser 22, a third riser 23, and a fourth riser 24, the four risers being fixed with an upper fixing member 25 and a lower fixing member 27 at both the top and the bottom of the four risers, and the four risers being slidingly connected with a middle movable member 26 outside the four risers, and a tie rod assembly 1 being provided between the first riser 21 and the The first upright 21 and the second upright 22 are provided with a tie rod assembly 1, the tie rod assembly 1 includes a tie rod joint 15 fixed at the bottom of the first upright 21 and the second upright 22 respectively, a contraction rod 16 is connected to each of the tie rod joints 15 by a rotating shaft, a tie rod fixing member 17 is connected to the intersection of two contraction rods 16 by a rotating shaft, and a third tie rod 14 is fixedly mounted in the tie rod fixing member 17, a second tie rod 13 is telescopically connected to the third tie rod 14, and a second tie rod 13 is fixedly mounted on the top and the bottom of the four uprights. the third tie rod 14, a second tie rod 13 is telescopically connected, a first tie rod 12 is telescopically connected within the second tie rod 13, and a puller 11 is fixed at the top of the first tie rod 12. In order to prevent slippage, the top of the puller 11 is also embedded with rubber, and in order to facilitate movement, a movable assembly 6 is also provided at the bottom of each upright, the movable assembly 6 comprising a wheel frame 61 rotationally connected to the four uprights, and wheels 62 are connected within each wheel frame 61 via a turn bar, and the bottom of the upright assembly 2 is also provided with a lifting assembly 5, the lifting assembly 5 comprising a first lifting rod 51, a second lifting rod 52, a third lifting rod 53 and a fourth lifting rod 54, wherein the first lifting rod 51, the second lifting rod 52, the third lifting rod 53 and the fourth lifting rod 54 are connected to the four lower fixing members 27 at one end respectively by a pivot, the first lifting rod 51, the second lifting rod 52, the third lifting rod 53 and the fourth lifting rod 54 are connected to a lifting member 55 at the other end by a pivot, and the first and second lifting rod 21 and second lifting rod 22 as well as the third lifting rod 23 and fourth lifting rod 24 are provided with a lift member 55 between them. The first upright 21 and the second upright 22, and the third upright 23 and the fourth upright 24 are provided with a front-to-back shrinkage adjustment assembly 3, the front-to-back shrinkage adjustment assembly 3 comprising a first front-to-back adjustment rod 31, a second front-to-back adjustment rod 32, a third front-to-back adjustment rod 33, and a fourth front-to-back adjustment rod 34, wherein the left side of the first front-to-back adjustment rod 31 is connected to the upper fixing member 25 at the top of the fourth upright 24 by a rotating shaft, and the right side of the second front-to-back adjustment rod 32 is connected to the third upright 23 by a rotating shaft. the right side of the second fore-and-aft adjusting rod 32 is connected to the upper fixing member 25 at the top of the third upright rod 23 through a rotary axis, the left side of the third fore-and-aft adjusting rod 33 is connected to the middle movable member 26 provided in the outer jacket of the fourth upright rod 24 through a rotary axis, and the right side of the fourth fore-and-aft adjusting rod 34 is connected to the middle movable member 26 provided in the outer jacket of the third upright rod 23 through a rotary axis. And, the first front-back adjusting lever 31 and the middle part of the third front-back adjusting lever 33 are connected by the pivot axis, the second front-back adjusting lever 32 and the middle part of the fourth front-back adjusting lever 34 are connected by the pivot axis, the end portions of the first front-back adjusting lever 31 and the second front-back adjusting lever 32 are connected by the pivot axis, the end portions of the third front-back adjusting lever 33 and the fourth front-back adjusting lever 34 are connected by the pivot axis, and the first vertical rod 21 and the third upright rod 23 and between the second upright rod 22 and the fourth upright rod 24 are respectively provided with a left-right contraction adjustment assembly 4, the left-right contraction adjustment assembly 4 comprising a first left-right adjustment rod 41, a second left-right adjustment rod 42, a third left-right adjustment rod 43, a fourth left-right adjustment rod 44, a fifth left-right adjustment rod 45, a sixth left-right adjustment rod 46, a seventh left-right adjustment rod 47 and an eighth left-right adjustment rod 48. Wherein, the left side of the first left-right adjusting rod 41 is connected to the upper fixing member 25 at the top of the second upright 22 by a rotary axis, the right side of the fourth left-right adjusting rod 44 is connected to the upper fixing member 25 at the top of the fourth upright 24 by a rotary axis, the left side of the fifth left-right adjusting rod 45 is connected to the middle movable member 26 outside the second upright 22 by a rotary axis, and the right side of the eighth left-right adjusting rod 48 is connected to the central movable member 26 outside the fourth upright 24 by a rotary axis. connected within the middle movable member 26 outside the fourth upright 24, the right side of the first right/left adjusting rod 41 and the left side of the fourth right/left adjusting rod 44 connected by a pivot axis, the right side of the fifth right/left adjusting rod 45 connected by a pivot axis at the middle one-third of the first right/left adjusting rod 41, the left side of the eighth right/left adjusting rod 48 connected by a pivot axis at the middle one-third of the fourth right/left adjusting rod 44, and the fifth left-right adjusting lever 45 is also connected to a sixth left-right adjusting lever 46 at one-half of the middle section of the fifth left-right adjusting lever 45 by a rotary axis, the right side of the sixth left-right adjusting lever 46 is connected to the left side of the second left-right adjusting lever 42 by a rotary axis, and the second left-right adjusting lever 42 is also connected to the first left-right adjusting lever 41 at one-half of the middle section of the first left-right adjusting lever 41 by a rotary axis at one-third of the middle section. Similarly, the eighth left-right adjusting lever 48 is also connected at one-half of the middle section of the eighth left-right adjusting lever 48 to the right side of the seventh left-right adjusting lever 47 by a pivot, and the left side of the seventh left-right adjusting lever 47 is connected at the right side of the third left-right adjusting lever 43 by a pivot, and the third left-right adjusting lever 43 is connected at one-third of the middle section of the third left-right adjusting lever 43 by a pivot to the one-half of the middle section of the fourth left-right adjusting lever 44, and the right side of the second left-right adjusting lever 42 and the left side of the third left-right adjusting rod 43 are connected by a pivot axis, so that a triangular region is formed between the first left-right adjusting rod 41, the fifth left-right adjusting rod 45, and the second upright 22, and the right bottom side of the triangular region is held by the sixth left-right adjusting rod 46, and similarly, a triangular region is formed between the fourth left-right adjusting rod 44, the eighth left-right adjusting rod 48, and the fourth upright 24, and the left bottom edge of the triangular region is held by the seventh left-right adjusting lever 47.

Figure 5:
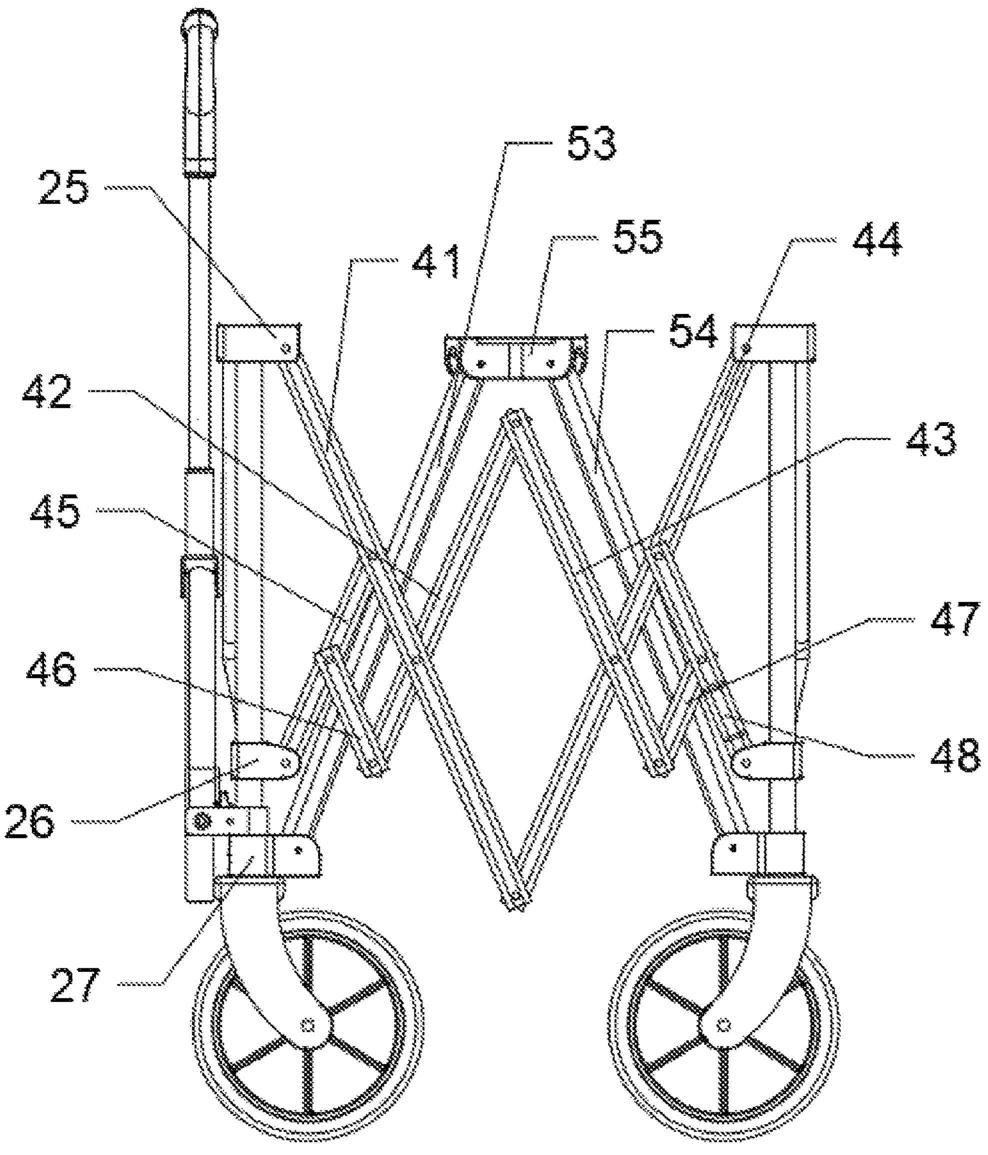
FIG. 5 is a schematic diagram of the main view structure of the half-folded state of the present application.
Figure 6:
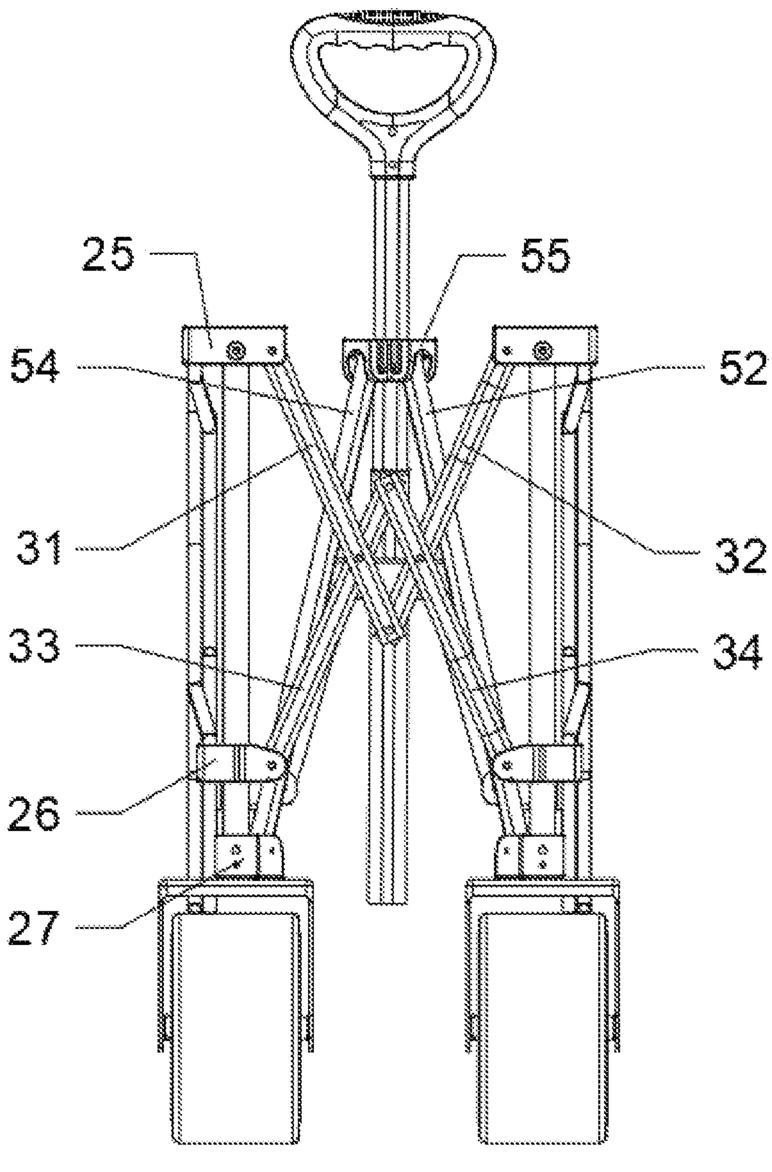
FIG. 6 is a schematic diagram of the right view structure of the half-folded state of the present application.
Figure 7:
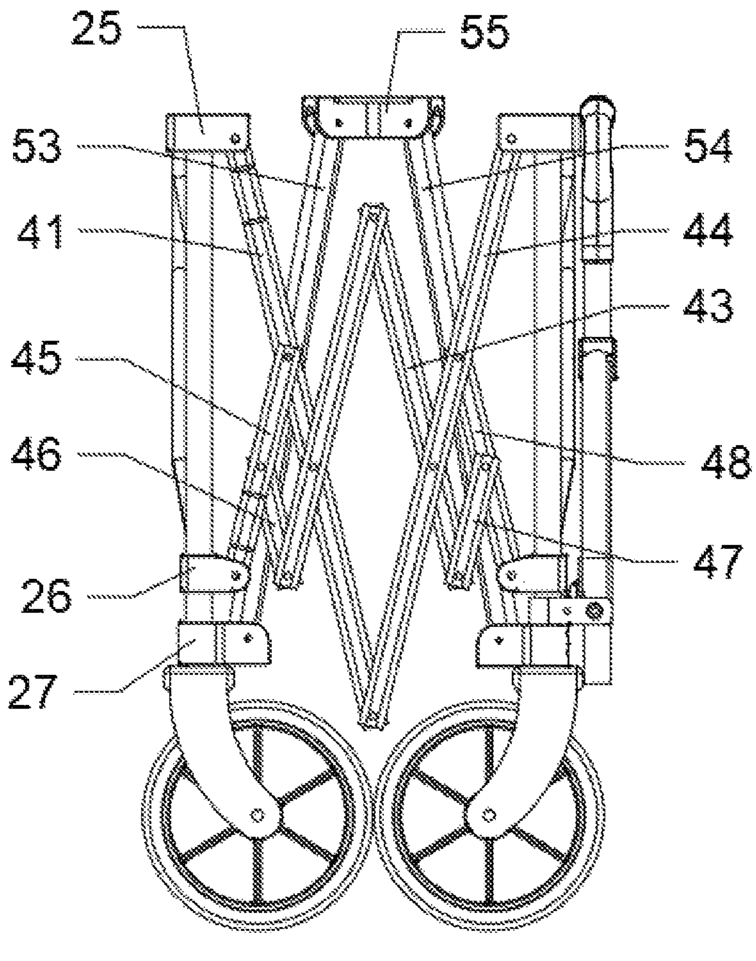
FIG. 7 is a schematic diagram of the main view structure of the fully folded state of the present application.
Figure 8:
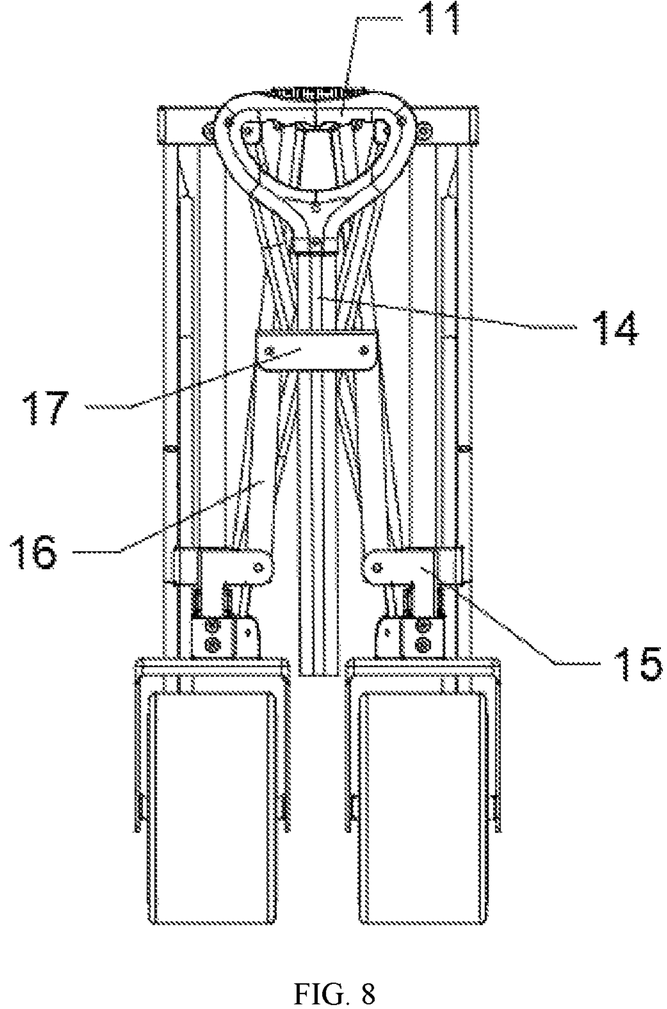
FIG. 8 is a schematic diagram of the left-view structure of the fully folded state of the present application.

Please refer to FIGS. 5 to 8 for the principle of the folding process of the present application, in which the gathering trailer, when folded, first pulls the lifting member 55 upward, so that the four lifting rods around it near the side of the lifting member 55 are also lifted upwardly, and the four lifting rods away from the side of the lifting member 55 are gradually closed in the direction of the lifting member 55, driving the four columns to gradually close in the direction as well. At this time, the angle between the end portions of the first left-right adjusting lever 41 and the fourth left-right adjusting lever 44 becomes smaller, the angle between the first left-right adjusting lever 41 and the second left-right adjusting lever 42 and the third left-right adjusting lever 43 and the end portion of the fourth left-right adjusting lever 44 is also reduced, and the angle between the fifth left-right adjusting lever 45 and the sixth left-right adjusting lever 46 and the sixth left-right adjusting lever 46 and the second left-right adjusting lever 42 and the second left-right adjusting lever 42 The angle between the third left-right adjusting rod 43 and the third left-right adjusting rod 43 and the seventh left-right adjusting rod 47 and the seventh left-right adjusting rod 47 and the end of the eighth left-right adjusting rod 48 also becomes smaller, and the process of contracting and gathering of the eight left-right adjusting rods is gradually completed. The angle between the first front and rear adjusting rod 31 and the second front and rear adjusting rod 32 and the third front and rear adjusting rod 33 and the end of the fourth front and rear adjusting rod 34 becomes smaller, while the angle between the first front and rear adjusting rod 31 and the third front and rear adjusting rod 33 and the second front and rear adjusting rod 32 and the fourth front and rear adjusting rod 34 becomes larger, and gradually completes the process of contracting and gathering of the four front and rear adjusting rods, and after being unfolded, a cloth bag is put in the center of the four rods for holding a cloth bag. A cloth bag is placed between the four poles to hold the articles. When the article is driven forward by the trailer in the cloth bag, it will swing from side to side, which is equivalent to applying a thrust force to the plane where the first upright 21 and the second upright 22 or the third upright 23 and the fourth upright 24 are located, and due to the symmetrical triangular region formed between the first left-right adjusting rod 41 and the fifth left-right adjusting rod 45 as well as the fourth left-right adjusting rod 44 and the eighth left-right adjusting rod 48, the triangular region also has a stability. Therefore, the pushing force does not easily deform the triangle, and at the same time, the sixth left-right adjusting rod 46 and the seventh left-right adjusting rod 47 play a supporting role for the fifth left-right adjusting rod 45 and the eighth left-right adjusting rod 48 respectively at the bottom, which further reinforces the stability of the triangle, and therefore it is difficult for the triangle to deform even if the weight of the article is heavier and the swinging amplitude is larger, the first vertical rod 21, second vertical rod 22, third vertical rod 23 and fourth vertical rod 24 will not be prone to the occurrence of the left and right tipping phenomenon.

Finally, it should be noted that the above mentioned are only the preferred examples of the present application and are not intended to limit the present application. Notwithstanding the detailed description of the present application with reference to the foregoing embodiments, a technician skilled in the art may still modify the technical solutions recorded in the foregoing embodiments or make equivalent substitutions for some of the technical features therein. All modifications, equivalent substitutions, improvements, etc. made within the spirit and principles of this application shall be included in the scope of protection of this application.

The invention claimed is:

1. A gathering trailer, comprising: an upright rod assembly, wherein the upright rod assembly comprises a first upright rod, a second upright rod, a third upright rod, and a fourth upright rod, a top and a bottom of each of the first, second, third and fourth upright rods being fixed with upper fixing members and four lower fixing members respectively, and the first, second, third and fourth upright rods being externally covered with middle movable members slidingly cooperating with the first, second, third and fourth upright rods;

left-and-right contraction adjusting assemblies are provided between the first upright rod and the third upright rod, and between the second upright rod and the fourth upright rod, as well as between the second upright rod and the fourth upright rod, respectively, the left-and-right contraction adjusting assemblies comprise a first left-and-right adjusting lever and a fourth left-and-right adjusting lever cooperating with the upper fixing members, and a fifth left-and-right adjusting lever and an eighth left-and-right adjusting lever cooperating with the middle movable members, a sixth left-and-right adjusting lever and a second left-and-right adjustment lever are sequentially provided outside the fifth left-and-right adjusting lever;

a seventh left-and-right adjusting lever and a third left-and-right adjusting lever are sequentially provided outside the eighth left-and-right adjusting lever.

2. The gathering trailer according to claim 1, wherein the first left-and-right adjusting lever and the fourth left-and-right adjusting lever are connected via a pivot axis, the fifth left-and-right adjusting lever and the first left-and-right adjusting lever are connected via a pivot axis;

the fifth left-and-right adjusting lever and the sixth left-and-right adjusting lever are connected via a pivot axis, and the sixth left-and-right adjusting lever is connected to the second left-and-right adjusting lever by means of a pivot axis;

the second left-and-right adjusting lever is also connected to the third left-right adjusting lever by means of a pivot axis, and the first left-and-right adjusting lever, the second left-and-right adjusting lever, the fifth left-and-right adjusting lever, the sixth left-and-right adjusting lever are symmetrically disposed with the fourth left-and-right adjusting lever, the third left-right adjusting lever, the eighth left-and-right adjusting lever, and the seventh left-and-right adjusting lever.

3. The gathering trailer according to claim 1, wherein the first upright rod and second upright rod, as well as the third upright rod and fourth upright rod are provided with front-and-rear contraction adjusting assemblies between them respectively;

the front-and-rear contraction adjusting assemblies comprise a first front-and-rear adjusting lever and a second front-and-rear adjusting lever cooperating with the upper fixing members, and the front-and-rear contraction adjusting assemblies further comprise a third front-and-rear adjusting lever and a fourth front-and-rear adjusting lever rotationally cooperating with the middle movable members.

4. The gathering trailer according to claim 3, wherein the first front-and-rear adjusting lever and the second front-and-rear adjusting lever are connected by a pivot axis, and the third front-and-rear adjusting lever and the fourth front-and-rear adjusting lever are connected by a pivot axis, and the first front-and-rear adjusting lever and the third front-and-rear adjusting lever are connected by a pivot axis, and the second front-and-rear adjusting lever and fourth front-and-rear adjusting lever are connected by a pivot axis, and the first front-and-rear adjusting lever and third front-and-rear adjusting lever are symmetrically disposed with the second front-and-rear adjusting lever and fourth front-and-rear adjusting lever.

5. The gathering trailer according to claim 1, wherein the upright rod assembly is provided with a lifting assembly at a bottom, the lifting assembly comprises a first lifting bar, a second lifting bar, a third lifting bar and a fourth lifting bar cooperating with the four lower fixing members, respectively, and the first lifting bar, the second lifting bar, the third lifting bar and the fourth lifting bar are distributed in an X-shape, and a lifting member is provided at a cross center of the first, second, third and fourth lifting bars.

6. The gathering trailer according to claim 1, wherein a pull rod assembly is arranged between the first upright rod and the second upright rod, the pull rod assembly comprises pull rod joint pieces fixed at bottoms of the first upright rod and the second upright rod, two of the pull rod joint pieces are provided with contraction rods rotationally matched therewith, two of the contraction rods are provided with a pull rod fixing piece rotationally matched therewith at the same time, a third pull rod is fixed inside the pull rod fixing piece, a second pull rod is sleeved inside the third pull rod, and a first pull rod is sleeved inside the second pull, and a top of the first pull rod is fixed with a handle.

7. The gathering trailer according to claim 1, wherein a bottom of the upright rod assembly is further provided with a movable assembly, and the movable assembly comprises wheel frames respectively installed at bottoms of four upright rods, and wheels are arranged in each of the wheel frames.

8. The gathering trailer according to claim 2, wherein when the gathering trailer is folded, a side angle between the first left-and-right adjusting lever and fifth left-and-right adjusting lever, the fifth left-and-right adjusting lever and sixth left-and-right adjusting lever, the first left-and-right adjusting lever and the second left-and-right adjusting lever, the fourth left-and-right adjusting lever and the eighth left-and-right adjusting lever, an angle between the eighth left-and-right adjusting lever and the seventh left-and-right adjusting lever, the fourth left-and-right adjusting lever and the third left-and-right adjusting lever gradually increases, and the side angle between the fifth left-and-right adjusting lever and the sixth left-and-right adjusting lever, the sixth left-and-right adjusting lever and the second left-and-right adjusting lever, the fifth left-and-right adjusting lever and the second left-and-right adjusting lever, the second left-and-right adjusting lever and the third left-right adjusting lever, the eighth left-and-right adjusting lever and the seventh left-and-right adjusting lever rod, the seventh left-and-right adjusting lever and the third left-right adjusting lever, the eighth left-and-right adjusting lever and the fourth left-and-right adjusting lever with the end pinch angle between said.

9. The gathering trailer according to claim 4, wherein when the gathering trailer is folded, the end pinch angle between the first front-and-rear adjusting lever and the second front-and-rear adjusting lever, the third front-and-rear adjusting lever and the fourth front-and-rear adjusting lever gradually decreases, and the end pinch angle between the first front-and-rear adjusting lever and the third front-and-rear adjusting lever, the second front-and-rear adjusting lever and the fourth front-and-rear adjusting lever, the side angle between the first front-and-rear adjusting lever and the third front-and-rear adjusting lever, the second front-and-rear adjusting lever and the fourth front-and-rear adjusting lever gradually increases.

10. The gathering trailer according to claim 5, the gathering trailer is folded in such a way that the lifting member gradually rises, and that the first lifting bar, the second lifting bar, the third lifting bar and the fourth lifting bar gradually rise close to one end of the lifting member.

* * * * *